United States Patent
Bogstad et al.

(10) Patent No.: US 10,627,131 B2
(45) Date of Patent: Apr. 21, 2020

(54) CHEMICAL DAMPER

(71) Applicant: Polyseam Limited, Huddersfield, West Yorkshire (GB)

(72) Inventors: Kjetil Bogstad, Notteroy (NO); Wolodymyr Hluchan, Shelley (GB)

(73) Assignee: Polyseam Limited, Huddersfield, West Yorkshire (GB)

( * ) Notice: Subject to any disclaimer, the term of this patent is extended or adjusted under 35 U.S.C. 154(b) by 307 days.

(21) Appl. No.: 15/303,109

(22) PCT Filed: Apr. 10, 2015

(86) PCT No.: PCT/GB2015/051104
§ 371 (c)(1),
(2) Date: Oct. 10, 2016

(87) PCT Pub. No.: WO2015/155547
PCT Pub. Date: Oct. 15, 2015

(65) Prior Publication Data
US 2017/0030609 A1 Feb. 2, 2017

(30) Foreign Application Priority Data

Apr. 11, 2014 (GB) .................................. 1406537.9

(51) Int. Cl.
*A62C 2/06* (2006.01)
*F24F 13/08* (2006.01)
*F24F 11/35* (2018.01)

(52) U.S. Cl.
CPC .............. *F24F 13/08* (2013.01); *A62C 2/065* (2013.01); *F24F 11/35* (2018.01); *F24F 2221/30* (2013.01)

(58) Field of Classification Search
CPC .. A62C 2/12; A62C 2/22; A62C 2/242; A62C 3/0257; A62C 2/06; A62C 2/065; E04B 9/08
USPC ............................. 454/369; 106/15.05–18.36
See application file for complete search history.

(56) References Cited

U.S. PATENT DOCUMENTS

| 2,148,530 | A | * | 2/1939 | Burke | ...................... A62C 2/12 126/287.5 |
| 5,957,211 | A | * | 9/1999 | Geuken | .................. A62C 2/065 169/48 |
| 5,962,603 | A | * | 10/1999 | Qureshi | .................. C08G 12/40 428/502 |
| 2006/0025067 | A1 | * | 2/2006 | Koessler | .................. F24F 7/02 454/359 |
| 2006/0198996 | A1 | * | 9/2006 | Morton | ................ D04H 1/4209 428/292.1 |

(Continued)

FOREIGN PATENT DOCUMENTS

| DE | 2052683 A1 | 5/1972 |
| DE | 2150551 A1 | 4/1973 |

(Continued)

OTHER PUBLICATIONS

Search Report dated Jun. 18, 2015, WO, PCT/GB2015/051104.

(Continued)

*Primary Examiner* — Vivek K Shirsat
*Assistant Examiner* — Ko-Wei Lin
(74) *Attorney, Agent, or Firm* — Howson & Howson LLP (57) ABSTRACT

According to the present invention, there is provided a damper for ducting comprising at least one fin comprising an intumescent composition.

14 Claims, 4 Drawing Sheets

(56) References Cited

U.S. PATENT DOCUMENTS

| | | | | |
|---|---|---|---|---|
| 2010/0014282 A1* | 1/2010 | Danesh | ............... | F21S 8/02 |
| | | | | 362/147 |
| 2014/0210111 A1* | 7/2014 | Chung | ............... | H01L 21/56 |
| | | | | 257/782 |
| 2014/0273799 A1* | 9/2014 | Erb | ............... | A62C 2/065 |
| | | | | 454/257 |

FOREIGN PATENT DOCUMENTS

| | | |
|---|---|---|
| DE | 2154841 A1 | 5/1973 |
| FR | 2254182 A5 | 7/1975 |
| GB | 2334675 A | 9/1999 |
| NZ | 513123 A | 11/2003 |
| WO | WO-1996/12525 | 5/1996 |
| WO | WO 1996/12525 A1 | 5/1996 |
| WO | WO 1999/22107 A1 | 5/1999 |
| WO | WO-1999/22107 A1 | 5/1999 |
| WO | WO 2001/21260 A1 | 3/2001 |
| WO | WO-2001/21260 A1 | 3/2001 |

OTHER PUBLICATIONS

International Search Report issued on corresponding International Patent Application No. PCT/GB2015/051104, dated Jun. 18, 2015.

* cited by examiner

CHEMICAL DAMPER

CROSS-REFERENCE TO RELATED APPLICATIONS

This application is a US national phase of International Patent Application No. PCT/GB2015/051104, filed Apr. 10, 2015, which claims the benefit of priority of GB 1406537.9, filed Apr. 11, 2014, which applications are incorporated herein by reference in their entirety.

The present invention relates to a damper for closing off a conduit. In particular the invention relates to a damper which prevents or inhibits the spread of a fire. These are often termed fire dampers.

Fire dampers are commonly used in ducting for ventilation systems, including heating circuits and air conditioning systems. Dampers are usually located at a position where the ducting passes through a fire barrier, for example a wall, door or ceiling.

Figure 1A:
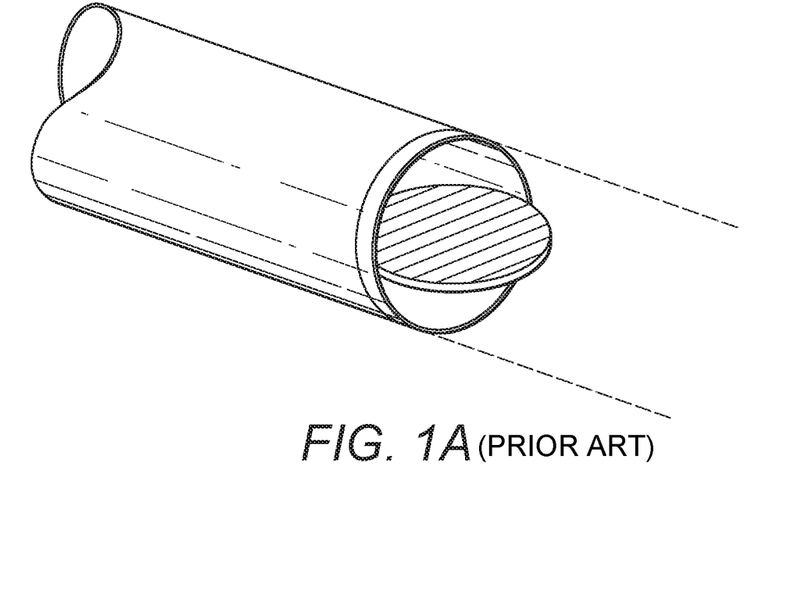
FIG. 1A and FIG. 1B show a traditional fire damper for ducting.
Figure 1B:
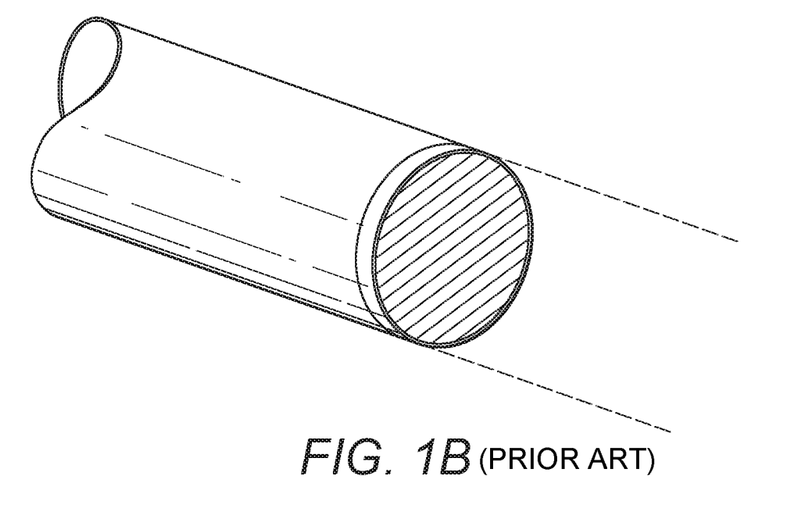

A traditional fire damper for ducting is shown in FIG. 1. In normal use (FIG. 1A) the damper is held open to allow air to flow through the duct. In a fire the damper automatically closes to seal the duct and prevent air flow (FIG. 1B).

Mechanical dampers of these types are usually held open during normal use by a magnetic or electrical signal. This magnetic or electrical signal is switched off in the event of a fire, and the damper is closed by a spring.

A disadvantage of these mechanical systems is that regular inspections and testing are needed to ensure that the dampers are in working order. It can also be complex to retrofit dampers to old ducting due to the necessity of including electrical or magnetic opening means.

The present invention provides an alternative damper which is chemical-based.

According to a first aspect of the present invention there is provided a damper for ducting comprising at least one fin comprising an intumescent composition.

The damper of the present invention may be directly located within the ducting or may be provided in a housing which fits into the ducting or is adapted to connect to the ducting.

The damper of the present invention may be used with any type of ducting. The ducting will typically be tubular in nature. It may have any shape of cross-section. In some common embodiments the ducting is of circular cross-section, and substantially cylindrical. However in some other embodiments the ducting may be rectangular, of any relative dimensions.

The damper comprises at least one fin comprising an intumescent composition. Suitably the plane of the fin is substantially perpendicular to the cross-section of the ducting.

By the cross-section of the ducting we mean to refer to a plane through the ducting which is substantially perpendicular to the longitudinal axis of the ducting. Thus a cylindrical ducting will typically have a circular cross section.

The damper may comprise more than one fin. The plane of the or each fin is preferably substantially perpendicular to the cross section of the ducting.

Positioning the fin or fins substantially perpendicular to the cross-section ensures that any reduction of the area of cross-section is minimised and thus air flow through the ducting is not significantly inhibited.

In this specification any reference to a fin applies as appropriate to each fin, in embodiments in which more than one fin is present.

The fin comprises an intumescent composition. In some embodiments the fin may consist essentially of the intumescent composition i.e. it is within the scope of the present invention to provide an intumescent composition of sufficient structural rigidity to be formed into a fin.

In some embodiments the fin comprises a substantially planar structure in which the intumescent composition is contained. The substantially planar structure in which the intumescent composition is contained may be made of any suitable material. Suitable materials include metals, plastics, wood and ceramics.

In some preferred embodiments the fin comprises a substantially planar structure which is coated with the intumescent composition. In some embodiments one face of the fin is coated with the intumescent composition. In preferred embodiments both faces of the fin are coated with the intumescent composition.

The fin may comprise a substantially solid planar substrate. However in preferred embodiments the fin comprises one or more apertures. Suitably the fin may be perforated, or in the form of a grid or mesh.

The provision of apertures in the structure of the fin enables the intumescent composition to expand through the apertures.

The fins may be made from any suitable material. Such materials include plastics, metals, wood and ceramics. In embodiments in which the fin is a plastic fin the plastic suitably has a melting point which is at least as high as the temperature at which the composition intumesces.

In preferred embodiments the damper comprises a plurality of fins. These may be positioned in any orientation relative to each other.

In preferred embodiments each fin is substantially perpendicular to the cross-section of the ducting.

In preferred embodiments the damper of the present invention comprises more than one fin. Preferably the damper comprises a plurality of fins which are substantially parallel to each other.

In preferred embodiments the fin or each fin is located within a housing.

Preferably the present invention provides a damper for ducting comprising a housing and at least one fin located within the housing, wherein the fin comprises an intumescent composition The housing is suitably shaped to fit within or connect to the ducting.

Preferably the damper is shaped to connect to the ducting. Typically in use the damper will connect two sections of ducting on either side of a fire barrier.

In preferred embodiments the ducting is substantially cylindrical. Preferably the housing is ring shaped.

Suitably the damper of the present invention comprises a ring shaped housing comprising a plurality of fins which each comprise an intumescent composition.

The plane of each fin is preferably substantially perpendicular to the circular face defined by the ring of the housing. The fins may be oriented in any position relative to each other. They may form a plurality of spoke or arcs. In some embodiments the fins may form a grid.

In preferred embodiments the damper comprises a plurality of fins which are substantially parallel to each other. Preferably the fins are spaced approximately equidistant from each other.

Thus the present invention suitably provides a damper comprising a ring shaped housing comprising a plurality of fins which are substantially parallel to each other and substantially perpendicular to the circular cross-section of the ring wherein each fin comprises an intumescent composition.

In some embodiments the fins may be supported by one or more rods or a comb shaped support. This is particularly useful in dampers of large cross section as the supporting rods and combs can ensure that the fins remain substantially equidistant across their length.

When heated above a certain temperature the intumescent composition swells and forms a char. The distance between the fins is suitably selected to ensure the char is able to form quickly and close the gaps between the fins.

The distance between the fins is preferably at least 0.5 cm, preferably at least 1 cm, suitably at least 1.5 cm, for example at least 2 cm or at least 2.5 cm.

The distance between the fins may be up to 10 cm, suitably up to 8 cm, preferably up to 7 cm, suitably up to 6 cm, for example up to 5 cm or up to 4.5 cm.

The coating of intumescent compositions on each fin is preferably at least 0.1 mm thick, suitably at least 0.25 mm, for example at least 0.5 mm. The coating suitably has a thickness of less than 10 mm, preferably less than 5 mm.

The formation of a char creates a thermal barrier and prevents heat (and smoke?) passing through the duct. The length of time for which the barrier will be effective depends on the depth of the fins. By the depth of a fin we mean to refer to the distance parallel to the longitudinal axis of a the ducting that the fin extends.

Preferably the or each fin has a depth of at least 1 cm, preferably at least 3 cm, more preferably at least 5 cm.

In some preferred embodiments the or each fin has a depth of 5 to 15 cm, preferably 8 to 12 cm, suitably about 10 cm.

The depth of the fin will depend on the desired rating of the thermal barrier. This will depend on the fire ratings of the surrounding materials. For example a damper in ducting passing through a wall with a fire rating of one hour will need to withstand a fire for at least one hour.

In some embodiments the depth of the fin may be up to 20 cm or even up to 50 cm. This may be useful for example if the ducting is adjacent to a room containing flammable materials.

In some embodiments the damper of the present invention comprises a mesh which extends across the cross-section of the ducting or the housing when present. The mesh is suitably substantially adjacent to the fin or fins.

In some especially preferred embodiments the damper comprises two meshes and the fin or fins are positioned therebetween.

The mesh may suitably be provided to prevent expanded intumescent material from being blown away through the ducting.

Fixing means may be provided to secure the mesh or meshes in position. For example in one embodiment a plurality of metal fingers are provided. In another embodiment a flange may be provided around the edge of the housing to secure the mesh to.

In some embodiments the damper of the present invention comprises a ring shaped housing comprising a plurality of fins which comprise an intumescent composition; wherein each circular face of the housing is closed by a mesh and wherein the fins are substantially parallel to each other and substantially perpendicular to the meshes.

In some embodiments the damper does not include a mesh. The inclusion of a mesh or not will depend on the particular use of the ducting and whether it is likely to become blocked during normal operation.

The or each fin of the dampers of the present invention comprises an intumescent composition. Suitably each fin is coated with the intumescent composition. Suitably each side of each fin is coated with the intumescent composition.

The intumescent composition preferably comprises one or more compounds selected from ammonium polyphosphate, phosphoric acid, sulphuric acid, boric acid, salts of boric acid, ammonium tetraborate, potassium tetraborate, sodium tetraborate, ammonium phosphate, ammonium sulphate, ammonium halides, urea, guanylurea phosphate, reaction products of $P_2O_5$ and ammonia, tricresyl phosphate, alkyl phosphate, haloalkyl phosphates, melamine, melamine cyanurate, melamine phosphate, melamine pyrophosphate, melamine polyphosphate, dicyandiamide, azodicarbonamide, linear amines (e.g. ethylene diamine-o-phosphate), guanidine phosphate, melamine borate, melam, melem, melon, pentaerythritol, dipentaerythritol, tripentaerythritol, starch, sugar, glucose, dextrin, sorbitol, mannitol, phenol formaldehyde resins, and methylol melamine.

Any suitable intumescent composition may be included in the damper of the present invention. Many such compositions will be known to the person skilled in the art.

However the present inventors have developed a novel intumescent composition for use with the damper which is particular advantageous. This composition expands quickly at relatively low temperatures to produce a dense char.

Suitably the fin comprises an intumescent composition comprising:
 (a) an intumescent material comprising phosphorus, sulfur, a halogen, a melamine compound, boron, a polyol or a mixture thereof;
 (b) an expandable intumescent material selected from graphite, silicate, vermiculite and mixtures thereof;
 (c) a polymeric binder; and
 (d) a fibrous material.

Component (a) is an intumescent material comprising phosphorous, sulfur, a halide, boron, a melamine compound, a polyol or a mixture thereof. Intumescent materials of this type are well known to the person skilled in the art.

Component (a) may comprise phosphorus. By this we mean to include any compound comprising a phosphorus atom or ion. Such compounds include, but are not limited to, phosphates, polyphosphates and other phosphoric acid salts and derivatives.

Component (a) may comprise sulfur. By this we mean to include any compound comprising a sulfur atom or ion. Such compounds include, but are not limited to, sulfates and other sulfuric acid salts and derivatives.

Component (a) may comprise boron. By this we mean to include any compound comprising a boron atom or ion. Such compounds include, but are not limited to, borates and other boric acid salts and derivatives.

Component (a) may comprise a halogen. By this we mean to include any compound comprising a halogen atom or halide ion. Such compounds include, but are not limited to, chloride and bromide salts.

Component (a) may comprise one or more compounds selected from ammonium polyphosphate, phosphoric acid, sulphuric acid, boric acid, salts of boric acid, ammonium tetraborate, potassium tetraborate, sodium tetraborate, ammonium phosphate, ammonium sulphate, ammonium halides, urea, guanylurea phosphate, reaction products of $P_2O_5$ and ammonia, tricresyl phosphate, alkyl phosphate, haloalkyl phosphates, melamine, melamine cyanurate, melamine phosphate, melamine pyrophosphate, melamine polyphosphate, dicyandiamide, azodicarbonamide, linear amines (e.g. ethylene diamine-o-phosphate), guanidine phosphate, melamine borate, melam, melem, melon, pentaerythritol, dipentaerythritol, tripentaerythritol, starch, sugar, glucose, dextrin, sorbitol, mannitol, phenol formaldehyde resins, and methylol melamine.

In some preferred embodiments component (a) comprises a phosphorous containing intumescent material. Suitably component (a) comprises a phosphate-containing intumescent material.

In some especially preferred embodiments component (a) comprises ammonium polyphosphate.

In some preferred embodiments component (a) comprises a melamine compound. Preferably component (a) comprises melamine.

In some embodiments component (a) comprises a polyol, i.e. a polyhydric alcohol. Suitable polyhydric alcohols include sugars and other carbohydrates.

Preferred polyols are pentaerythritol, dipentaerythritol and tripentaerythritol. Pentaerythritol is especially preferred.

In some embodiments component (a) comprises a mixture of compounds.

In some embodiments component (a) comprises a first material selected from ammonium polyphosphate, phosphoric acid, sulphuric acid, boric acid, salts of boric acid, ammonium tetraborate, potassium tetraborate, sodium tetraborate, ammonium phosphate, ammonium sulphate, ammonium halides, urea, guanylurea phosphate, reaction products of $P_2O_5$ and ammonia, tricresyl phosphate, alkyl phosphate and haloalkyl phosphates; a second material selected from melamine, melamine cyanurate, melamine phosphate, melamine pyrophosphate, melamine polyphosphate, dicyandiamide, azodicarbonamide, linear amines (e.g. ethylene diamine-o-phosphate), guanidine phosphate, melamine borate, melam, melem, melon; and a third material selected from pentaerythritol, dipentaerythritol, tripentaerythritol, starch, sugar, glucose, dextrin, sorbitol, mannitol, phenol formaldehyde resins, and methylol melamine.

In some preferred embodiments component (a) comprises a first material selected from ammonium polyphosphate, ammonium tetraborate and ammonium phosphate; a second material selected from melamine and dicyandiamide; and a third material selected from pentaerythritol, dipentaerythritol and tripentaerythritol.

Suitably component (a) comprises a phosphate-containing compound and a melamine compound. Preferably component (a) comprises ammonium polyphosphate and melamine.

In some especially preferred embodiments component (a) further comprises a polyol. Suitably component (a) comprises a phosphate-containing compound, a melamine compound and a pentaerythritol compound.

Component (b) comprises an expandable intumescent material selected from graphite, silicate, vermiculite and mixtures thereof. Materials of this type are known to the person skilled in the art. Preferably component (b) comprises an expandable graphite material.

Component (c) is a polymeric binder. Suitable polymeric binders include styrene/acrylic copolymers, vinyl acetate polymers, vinyl acetate/VeoVa/acrylate copolymers, acrylic polymers, acrylic/VeoVa copolymers, acrylic/styrene copolymers, styrene/butadiene copolymers, styrene/butadiene/acrylonitrile copolymers, polybutadiene polymers, alkyd polymers, epoxy polymers, polyurethane modified silanes, silicones, polysulphides, polyaspartic polymers and polyurethane polymers. VeoVa refers to the vinyl ester of versatic acid. As the skilled person will appreciate a number of versatic acids are available. Versatic acid 10, a highly branched isomer of decanoic acid is preferred.

Preferred polymeric binders for use in the compositions of the present invention are styrene/acrylic copolymers.

The polymeric binder is preferably incorporated into the composition as an aqueous emulsion. Such an emulsion typically comprises particles of the polymer suspended in an emulsion which coalesce on drying to form the polymeric binder.

Component (d) is a fibrous material. Suitable fibrous materials include silicate fibres, mineral fibres, aramid fibres, carbon fibres, imide fibres, cellulosic fibres and diatomaceous earth fibres. Especially preferred fibrous materials are alkaline earth silicate fibres. Suitably the fibres are from 1 μm to 1 mm in diameter.

In some embodiments the intumescent composition further comprises (e), an inorganic filler. Suitable inorganic fillers include titanium dioxide, kaolin, barytes, perlite (aluminium silicate), cenospheres, carbonates (e.g. calcium carbonate and dolomite), metal hydroxides (e.g. aluminium hydroxide, magnesium hydroxide), huntite, hydromagnesite, vermiculite (mica), portland cement clinker, glass, plaster of paris (gypsum), calcined kaolin, fly ash, slag, calcium sulfate, silica gel, silicates (e.g. calcium silicate), silica (quartz), talc, wollastonite, zinc stearate, zinc oxide, aluminium oxide, zeolite, Ceepree (glass frits), lead oxide, silicon and borates (e.g. potassium tetraborate, potassium borate, ammonium tetraborate, sodium borate).

An especially preferred filler is titanium dioxide.

Component (a) is preferably present in the intumescent composition in an amount of at least 5 wt %, suitably at least 10 wt %, preferably at least 15 wt %, preferably at least 20 wt %, more preferably at least 25 wt %, for example at least 30 wt % or at least 35 wt %.

Component (a) may be included in the composition in an amount of up to 80 wt %, suitably up to 70 wt %, preferably up to 65 wt %, suitably up to 60 wt %, more preferably up to 55 wt %, for example up to 50 wt % or up to 45 wt %.

In embodiments in which component (a) comprises a mixture of compounds the above amounts refer to the total of all such compounds present in the composition.

In some embodiments the composition comprises ammonium phosphate or ammonium polyphosphate in an amount of from 10 to 40 wt %, suitably from 15 to 35 wt %, preferably from 20 to 30 wt %, for example from 22 to 28 wt %.

In some embodiments the composition includes a melamine component in an amount of from 1 to 20 wt % preferably from 2 to 15 wt %, suitably from 5 to 10 wt %.

In some embodiments the composition comprises a pentaerythritol component in amount of 1 to 20 wt % preferably from 2 to 15 wt %, suitably from 5 to 10 wt %.

In some especially preferred embodiments the intumescent composition comprises from 15 to 35 wt % of ammonium polyphosphate, from 2 to 15 wt % of melamine, and from 2 to 15 wt % of pentaerythritol.

Component (b) is preferably present in the intumescent composition in amount of at least 1 wt %, suitably at least 2.5 wt %, preferably at least 5 wt %, more preferably at least 7 wt %, for example at least 8 wt % or at least 10 wt %.

Component (b) may be included in the intumescent composition in an amount of up to 40 wt %, suitably up to 30 wt %, preferably up to 25 wt %, more preferably up to 20 wt %, for example up to 17 wt % or up to 15 wt %.

In embodiments in which component (b) comprises a mixture of compounds, the above amounts refer to the total amounts of all such compounds present in the composition.

Component (c) is a polymeric binder. This may suitably be incorporated into the composition in the form of a solution or emulsion, preferably an aqueous emulsion of polymeric binder.

The binder is suitably provided as a solution or emulsion comprising from 10 to 80 wt %, preferably from 30 to 70 wt %, typically from 35 to 65 wt % solids.

This solution or emulsion may be described as binder precursor composition.

The binder precursor composition is suitably incorporated in the intumescent composition in amount of at least 1 wt %, suitably in an amount of at least 5 wt %, preferably at least 10 wt %, more preferably at least 12 wt %, for example at least 15 wt %, at least 20 wt % or at least 25 wt %.

The binder precursor composition may be included in the composition in an amount of up to 50 wt %, suitably up to 45 wt %, more preferably up to 40 wt %, for example up to 35 wt %, up to 33 wt % or up to 30 wt %.

The binder precursor composition is suitably included in an amount to provide an intumescent composition comprising from 1 to 50 wt %, preferably from 10 to 35 wt %, and more preferably from 15 to 30 wt % polymeric binder.

Where a mixture of binders is included the above amount refers to the total amounts of all binders and binder precursor compositions included in the intumescent composition.

Component (d) is preferably present in the intumescent composition in amount of at least 0.1 wt %, preferably at least 0.25 wt %, suitably in an amount of at least 0.5 wt %, preferably at least 0.75 wt %, more preferably at least 1 wt %.

Component (d) may be included in the composition in an amount of up to 10 wt %, suitably up to 5 wt %, preferably up to 4 wt %, for example up to 3 wt %, or up to 2 wt %.

Where component (d) comprises a mixture of compounds the above amounts refer to the total of all such compounds present in the composition.

Component (e) is preferably present in the intumescent composition in amount of at least 0.1 wt %, preferably at least 1 wt %, suitably at least 2.5 wt %, preferably at least 5 wt %, more preferably at least 7 wt %.

Component (e) may be included in the composition in an amount of up to 30 wt %, suitably up to 25 wt %, preferably up to 20 wt %, more preferably up to 15 wt %, for example up to 12 wt %.

Where component (e) comprises a mixture of compounds the above amounts refer to the total of all such compounds present in the composition.

The intumescent composition may further comprise one or more solvents. Suitable solvents include water and other water-miscible solvents.

Suitably the composition comprises at least 1 wt % water, preferably at least 2.5 wt %, more preferably at least 5 wt %.

The intumescent composition may comprise up to 30 wt % water, preferably up to 20 wt %, more preferably up to 12 wt %.

The above amounts refer to water added to the composition in addition to any water included in other ingredients, for example a binder precursor composition.

The intumescent composition may comprise one or more further components selected from biocides, fragrances, fillers, adhesion agents, additional intumescents and fire-stop agents, buffers, dispersing agents, surfactants, deaerators, defoamers, surface control additives, hydrophobing agents, wetting additives, rheological additives, anti-cratering additives, radiation curing additives, anti-corrosion additives and anti-graffiti additives.

The composition may comprise a pH regulator. Any suitable pH regulator may be used and these will be known to the person skilled in the art. One suitable pH regulator is 2-amino-2-methyl-1-propanol.

Suitably the intumescent composition has a pH of from 5 to 13, suitably from 7 to 11.

Suitably the intumescent composition intumesces at a relatively low temperature and expands quickly to form a dense char, thus closing the damper.

The char formed suitably has sufficient structural rigidity to withstand a pressure difference of 300 Pa between the fire and non-fire sides of the barrier formed.

Suitably the composition swells to at least 5 times (500%), preferably at least 7 times (700%) of its original thickness in less than 2 minutes when heated according to the EN1363-1 (ISO 834) fire test. The temperature in the furnace after 1 minute of this test is approximately 349° C. and after 2 minutes it is approximately 445° C.

Suitably the intumescent composition of the present invention intumesces at a temperature of 200° C. or less, preferably 150° C. or less, preferably 120° C. or less.

Figure 2:
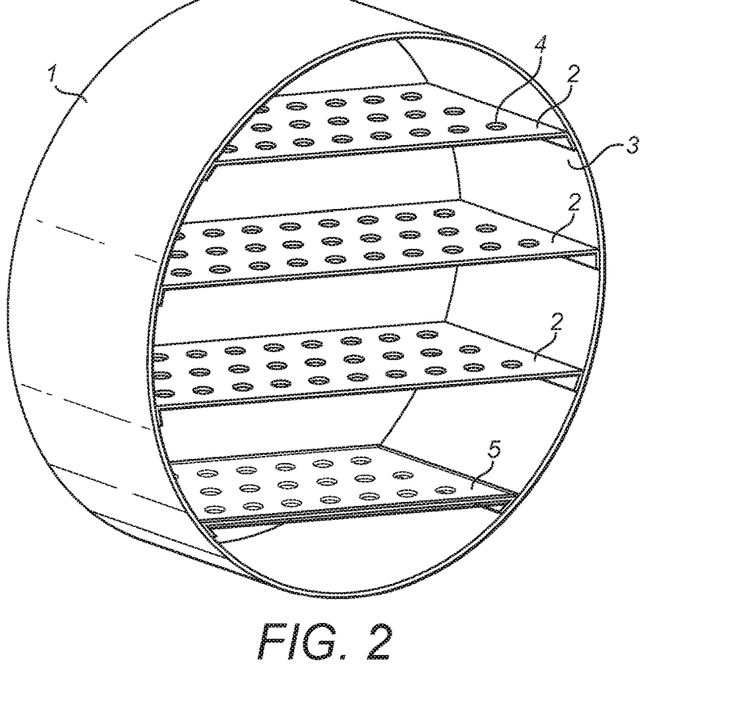
FIG. 2 shows a damper having fins that can be coated with an intumescent composition.
Figure 3:
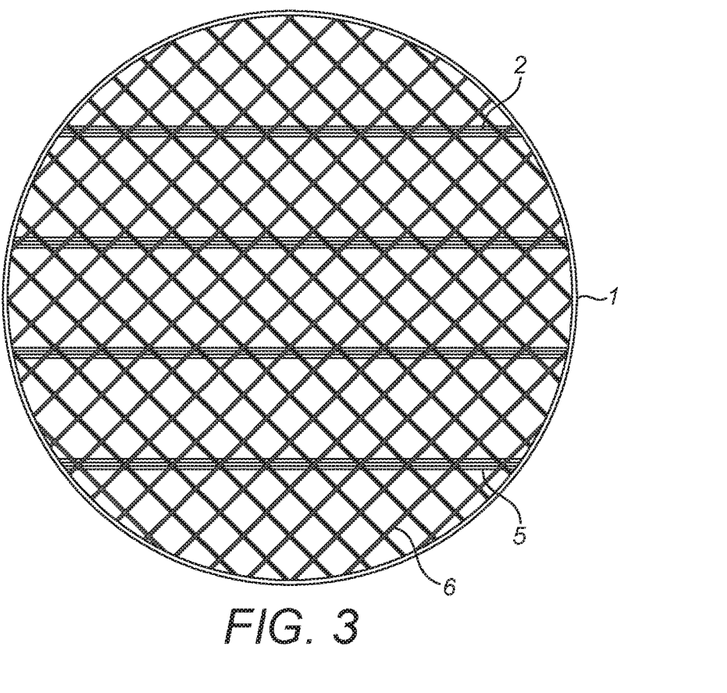
FIG. 3 shows a cross-sectional view of the damper shown in FIG. 2.

A preferred embodiment of the present invention will now be further described with reference to the accompanying figures in which:

FIG. 2 shows a damper of the present invention;

FIG. 3 shows a cross-sectional view of the damper of FIG. 2; and

Figure 4:
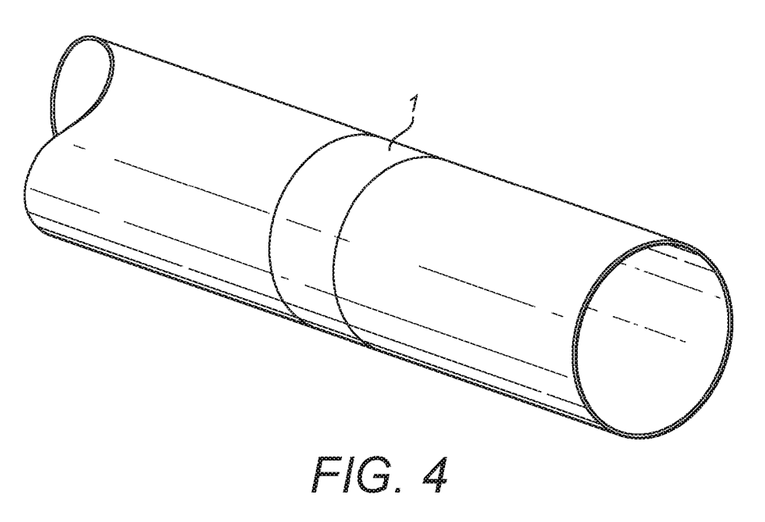
FIG. 4 shows a damper connected to a portion of ducting.

FIG. 4 shows the damper connected to a portion of ducting.

Preferred features of this embodiment will now be described. However it will be appreciated that these features may as appropriate apply to other embodiments of the invention.

The damper comprises a ring shaped housing 1 which is made of steel. Within the housing are a plurality of parallel fins 2 which are affixed to the internal surface of the housing 3. The fins each comprise a number of apertures 4. However it will be appreciated that fins which are solid or which are in the form of a grid or mesh could also be used. The fins in a preferred embodiment are made of steel but alternative materials may be used. In the embodiment shown the fins are spot-welded onto the inside of the housing, but other methods of fixing the fins into the housing are within the scope of the invention.

Each fin is coated on both sides with a layer of intumescent material 5. This is only shown on the bottom fin in FIG. 2. However embodiments in which only one face of the fin is coated are also within the scope of the invention.

The intumescent material may be coated onto the fin by any suitable means, for example painting, dipping or casting into sheets.

In some embodiments the intumescent composition is structurally rigid and may itself be formed directly into a fin, rather than being applied to a separate substrate. In such embodiments the fin may be cast, moulded or extruded. It may be made by any other suitable method.

Each face of the damper housing is closed by a mesh 6 which can be seen in FIG. 3 but is not shown in FIG. 2. The mesh is suitably a metal or other material which can withstand high temperatures likely to arise in a fire. The mesh may be held in position by a plurality of metal fingers (not shown). The distance between the fins is preferably approximately equal. The distance is suitably selected to ensure that a char is able to form quickly and close the gaps between the fins.

The distance between the fins is preferably 0.5 to 10 cm, more preferably 1.5 to 7 cm, most preferably 2.5 to 4.5 cm.

According to the second aspect of the present invention there is provided ducting comprising a damper of the first aspect.

The present invention may also provide an intumescent composition as described herein.

The invention will now be further defined with reference to the following example.

EXAMPLE 1

An intumescent composition of the invention was prepared comprising the following components:

| Ingredient | Amount (g) |
| --- | --- |
| Water | 245.8 |
| Pentaerythritol | 233.7 |
| Melamine | 233.7 |
| Ammonium polyphosphate | 767.4 |
| 2-amino-2-methyl-1-propanol | 8.7 |
| Alkaline earth silicate fibre | 45.0 |
| Styrene acrylic copolymer | 803.2 |
| Polyacrylate dispersion | 25.4 |
| Mineral hydrocarbon, silica and surface active material | 2.1 |
| Titanium dioxide | 280.2 |
| Expandable graphite | 352.3 |
| Preservative | 2.1 |
| Total | 2999.6 g |

This composition was coated onto perforated steel fins which were located in the fire damper of FIGS. 2 and 3. The damper was tested according to EN1366, Part 12. This is the fire resistance standard for non-mechanical dampers. The fire test curve that is used to heat the furnace as part of this test standard is EN1633-1 (ISO834).

Figure 5A:
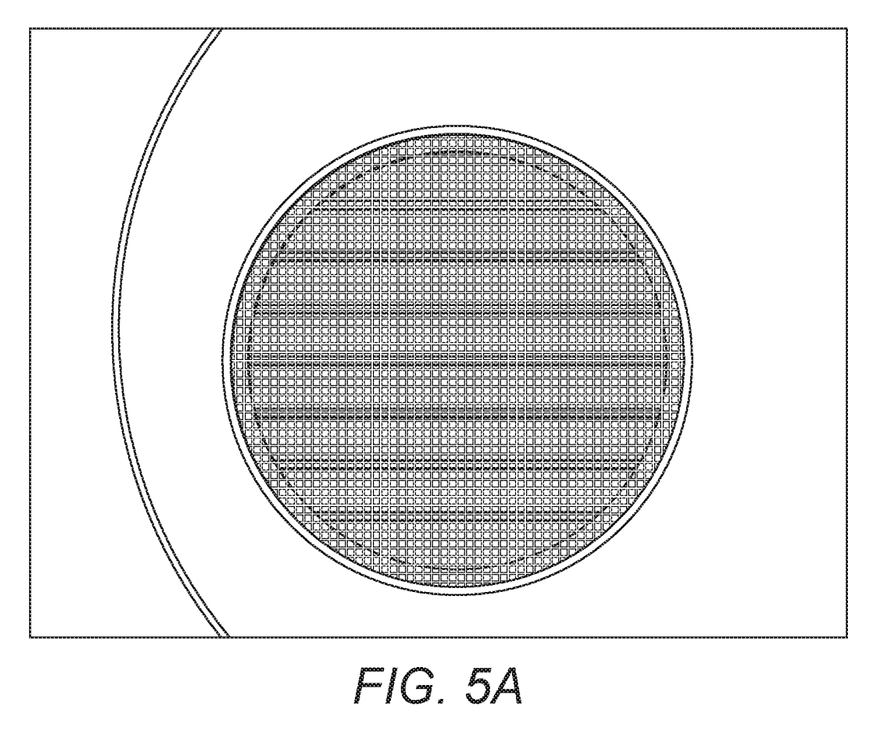
FIG. 5A shows a damper prior to a test. Air is allowed to pass freely through the ducting.

FIG. 5A shows the damper prior to the test open to allow air to pass freely through the ducting.

Figure 5B:
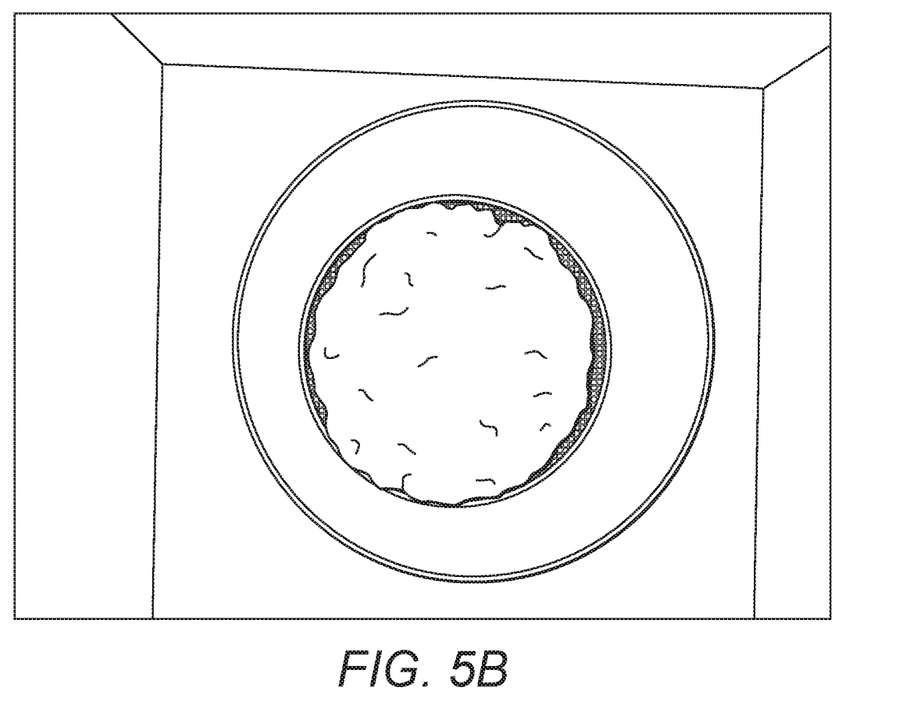
FIG. 5B shows a damper after a test. A dense char has formed closing the ducting.

FIG. 5B shows the damper after the test which clearly shows that a dense char has formed closing the ducting.

The invention claimed is:

1. A damper for ducting comprising at least one fin comprising an intumescent composition, wherein the intumescent composition comprises:
   (a) an intumescent material comprising phosphorus, sulfur, a halogen, a melamine compound, boron, a polyol or a mixture thereof;
   (b) an expandable intumescent material selected from graphite, silicate, vermiculite and mixtures thereof;
   (c) a polymeric binder comprising styrene/acrylic copolymers incorporated into the composition as an aqueous emulsion; and
   (d) a fibrous material;
   wherein the intumescent material comprises:
   one or more compounds selected from ammonium polyphosphate, phosphoric acid, sulphuric acid, boric acid, salts of boric acid, ammonium tetraborate, potassium tetraborate, sodium tetraborate, ammonium phosphate, ammonium sulphate, ammonium halides, urea, guanylurea phosphate, reaction products of $P_2O_5$ and ammonia, tricresyl phosphate, alkyl phosphate and haloalkyl phosphates;
   a second material selected from melamine, melamine cyanurate, melamine phosphate, melamine pyrophosphate, melamine polyphosphate, dicyandiamide, azodicarbonamide, linear amines, guanidine phosphate, melamine borate, melam, melem, melon;
   and a third material selected from pentaerythritol, dipentaerythritol, tripentaerythritol, starch, sugar, glucose, dextrin, sorbitol, mannitol, phenol formaldehyde resins, and methylol melamine;
   wherein the at least one fin comprises one or more apertures; and wherein the composition swells to at least five times its original thickness in less than two minutes when heated according to the EN1363-1 (ISO 834) fire test.

2. The damper according to claim 1 which is provided in a housing which fits into the ducting or is adapted to connect to the ducting.

3. The damper according to claim 1 wherein the plane of the fin is substantially perpendicular to the cross-section of the ducting.

4. The damper according to claim 1 which comprises more than one fin.

5. The damper according to claim 4 wherein the fins are substantially parallel to each other.

6. The damper according to claim 5 wherein the fins are spaced approximately equidistant from each other.

7. The damper according to claim 1 which comprises a ring shaped housing.

8. The damper according to claim 7 wherein at least one circular cross-section of the housing is closed by a mesh.

9. The damper according to claim 1 wherein component (a) comprise a phosphate-containing compound, a melamine compound and a pentaerythritol compound.

10. A damper according to claim 1 wherein component (b) comprises an expandable graphite material.

11. A damper according to claim 1 wherein component (d) comprises alkaline earth silicate fibers.

12. Ducting comprising a damper as claimed in claim 1.

13. An intumescent composition as defined in claim 1.

14. The damper according to claim 1 when the second material comprises the linear amines ethylene diamine-o-phosphate.

* * * * *